(12) United States Patent
Kim

(10) Patent No.: US 8,955,774 B2  
(45) Date of Patent: Feb. 17, 2015

(54) WATER-DRIP HOSE

(75) Inventor: Jae Gon Kim, Incheon (KR)

(73) Assignee: Sam Won Industry Co., Ltd., Incheon (KR)

(*) Notice: Subject to any disclaimer, the term of this patent is extended or adjusted under 35 U.S.C. 154(b) by 507 days.

(21) Appl. No.: 13/311,405

(22) Filed: Dec. 5, 2011

(65) Prior Publication Data

US 2012/0145812 A1     Jun. 14, 2012

(30) Foreign Application Priority Data

Dec. 9, 2010   (KR) ................... 10-2010-0125450

(51) Int. Cl.  
    *B05B 15/00*     (2006.01)  
    *A01G 25/02*     (2006.01)

(52) U.S. Cl.  
    CPC ...................... *A01G 25/02* (2013.01)  
    USPC ........... 239/542; 239/145; 239/547; 156/252; 156/513

(58) Field of Classification Search  
    USPC .............. 239/1, 145, 542, 547; 156/203, 252, 156/513  
    See application file for complete search history.

(56) References Cited

U.S. PATENT DOCUMENTS

| | | | | |
|---|---|---|---|---|
| 4,859,264 A | * | 8/1989 | Buluschek | 156/252 |
| 5,076,498 A | * | 12/1991 | Townsend | 239/542 |
| 5,217,557 A | * | 6/1993 | Hogan | 156/252 |

FOREIGN PATENT DOCUMENTS

KR    10-0754779 B1    9/2007  
KR    10-0932433 B1    12/2009

OTHER PUBLICATIONS

Korean Office Action (10-2010-0125450) mailed on Aug. 15, 2012.

* cited by examiner

*Primary Examiner* — Steven J Ganey  
(74) *Attorney, Agent, or Firm* — Rabin & Berdo, P.C.

(57) ABSTRACT

A water-drip hose comprises: the first fusion splicing units formed to have an upper fusion splicing line parallel to an end portion of the outer film, a lower fusion splicing line shorter than the upper fusion splicing line, and side fusion splicing lines of a smooth curved shape for connecting the upper fusion splicing line with the lower fusion splicing line; two second fusion splicing units respectively formed at a lower position between the first fusion splicing unit and a neighboring first fusion splicing unit in parallel to the lower fusion splicing line of the first fusion splicing unit at regular intervals, which forms three lower openings; and a third fusion splicing unit formed at an upper position between the first fusion splicing unit and the neighboring first fusion splicing unit in parallel to the upper fusion splicing line of the first fusion splicing unit, which forms two upper openings.

8 Claims, 3 Drawing Sheets

WATER-DRIP HOSE

CROSS-REFERENCE TO RELATED APPLICATION

The present application claims the benefit under 35 U.S.C. §119(a) to Korean patent application No. 10-2010-0125450, filed on Dec. 9, 2010, the disclosure of which is expressly incorporated by reference herein in its entirety.

BACKGROUND OF THE INVENTION

1. Field of the Invention

The present invention relates to a water-drip hose, and more particularly, to a water-drip hose, in which water supplied through a main water flow path of the water-drip hose is uniformly discharged through upper openings formed between first fusion splicing units regardless of water pressure.

2. Background of the Related Art

Generally, when raising crops, a hose installed to be close to the roots of the crops is used as a method of supplying water inside the hose onto the ground through water flow holes formed on the outer circumferential surface of the hose.

In general, extremely minute water flow holes are formed so as to continuously supply a small amount of water on the ground, and thus water drops are formed and supplied onto the ground through the water flow holes.

However, since water pressure at the supply side supplying water is high and the water pressure gradually decreases as the hose goes farther from the supply side, it is general that the amount of water supplied is large at a place where the water pressure is high, and the amount of water supplied is small at a place where the water pressure is low.

As a solution for resolving the problem, water-drip hoses are used in order to supply crops with the same amount of water through water flow holes regardless of water pressure inside the hoses.

A water-drip hose capable of discharging a uniform amount of water through each water flow hole regardless of the internal water pressure of the hose is entitled to be referred to as a good hose. That is, since the crops have a different growth rate depending on the amount of supplied water, the amount of water supplied through the water flow holes of the water-drip hose should be uniform in order to encourage uniform growth of the crops.

Conventionally, various kinds of water-drip hoses capable of offsetting water pressure generated inside the water-drip hoses are used. For example, a plurality of resistive bodies having a resistive structure are attached to the water flow holes supplying water to the ground from a water-drip hose, or the water-drip hose is formed into a double pipe.

The water-drip hose is formed into a double tube by rolling a portion of a synthetic resin film to be overlapped in a cylindrical form and bonding end portions of the resin film, in which an inner water flow path is formed inside, and an outer water flow path is formed at the overlapped portion. A thread is inserted inside the outer water flow path in the longitudinal direction, and a plurality of inner water flow holes is formed at the inner and outer water flow paths at regular intervals. In addition, outer water flow holes for fluid-communicating the outer water flow path and the outer circumference of the hose are formed, so that water supplied from the inner water flow path moves toward the outer water flow path through the inner water flow holes, and the water moved to the outer water flow path is discharged outside of the hose through the outer water flow holes.

However, the conventional water-drop hoses have a problem in that although the water supplied from the inner water flow path to the outer water flow path arrives at the outer water flow holes, the amount of water supplied to the outer water flow path changes depending on water pressure generated in the inner water flow path.

Furthermore, since the conventional water-drip hoses are manufactured using a synthetic resin hose, inside of the hose is dried and tightly stuck together if water is not supplied, and thus although water is supplied, the water supplied into the hose does not flow inside the hose.

SUMMARY OF THE INVENTION

Therefore, the present invention has been made in view of the above problems, and it is an object of the present invention to provide a water-drip hose, in which water supplied through a main water flow path of the water-drip hose is uniformly discharged through upper openings formed between first fusion splicing units regardless of water pressure, and although inside of the water-drip hose is dried, the upper openings are not clogged by preventing the inside of the hose from being tightly stuck together, and lower openings are easily opened at the same time.

To accomplish the above object, according to one aspect of the present invention, there is provided a water-drip hose A, in which an overlapped portion 4 is formed by overlapping an outer film 2 at one end of a resin film 1 with an inner film 3 at the other end of the resin film 1, and a main water flow path 5 is formed inside the water-drip hose by a plurality of first fusion splicing units 10 fusedly formed on the overlapped portion 4, the water-drip hose comprising: the first fusion splicing units 10 formed to have an upper fusion splicing line 110 parallel to an end portion of the outer film 2, a lower fusion splicing line 120 shorter than the upper fusion splicing line 110, and side fusion splicing lines 130 of a smooth curved shape for connecting the upper fusion splicing line 110 with the lower fusion splicing line 120; two second fusion splicing units 20 respectively formed at a lower position between the first fusion splicing unit 10 and a neighboring first fusion splicing unit 10 in parallel to the lower fusion splicing line 120 of the first fusion splicing unit 10 at regular intervals, which forms three lower openings 40; and a third fusion splicing unit 30 formed at an upper position between the first fusion splicing unit 10 and the neighboring first fusion splicing unit 10 in parallel to the upper fusion splicing line 110 of the first fusion splicing unit 10, which forms two upper openings 50.

In addition, the second fusion splicing units 20 are formed in a shape of , so that a lower fusion splicing line 210 of the second fusion splicing unit 20 is formed in parallel to the lower fusion splicing line 120 of the first fusion splicing unit 10, and the third fusion splicing unit 30 is formed in a shape of , so that an upper fusion splicing line 310 of the third fusion splicing unit 30 is formed in parallel to the upper fusion splicing line 110 of the first fusion splicing unit 10.

In addition, width $l_1$ of the lower opening 40 is formed to be larger than width $l_2$ of the upper opening 50.

In addition, height $h_2$ of the second fusion splicing unit 20 is half of height $h_1$ of the first fusion splicing unit 10, and height $h_3$ of the third fusion splicing unit 30 is the same as the height $h_2$ of the second fusion splicing unit 20.

In addition, the first fusion splicing unit 10, the second fusion splicing unit 20 and the third fusion splicing unit 30 are formed by heat fusion or high frequency fusion, and a plurality of tiny projections 11 having a size of 30 to 70 meshes is formed on one side of the resin film 1.

DESCRIPTION OF SYMBOLS

Figure 1:
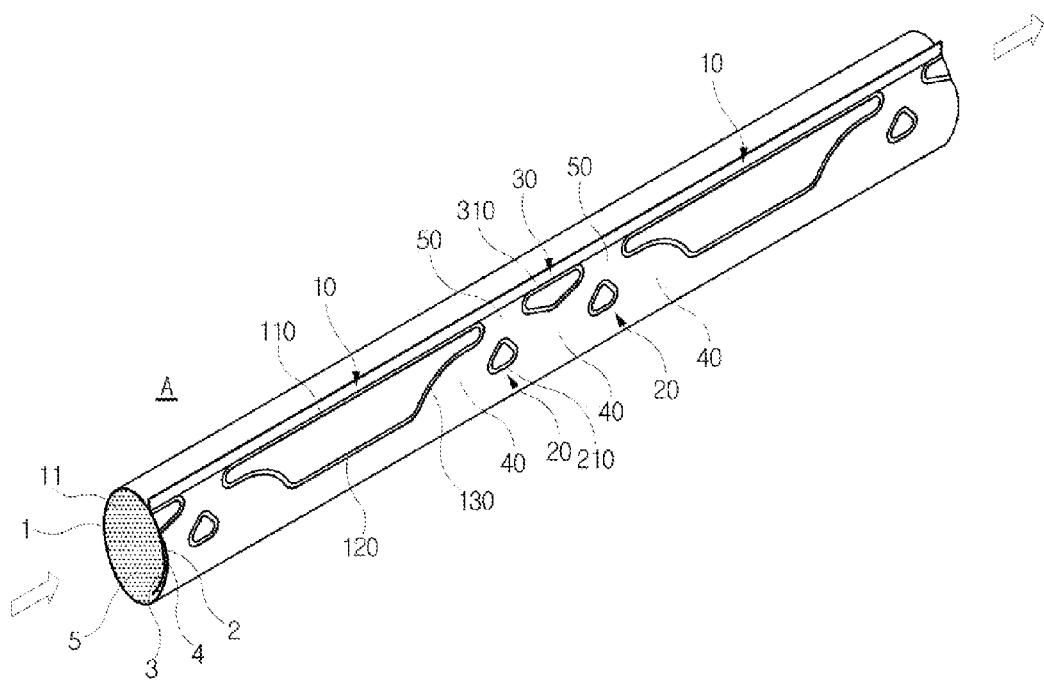
FIG. 1 is a perspective view showing a water-drip hose according to the present invention.
Figure 2:
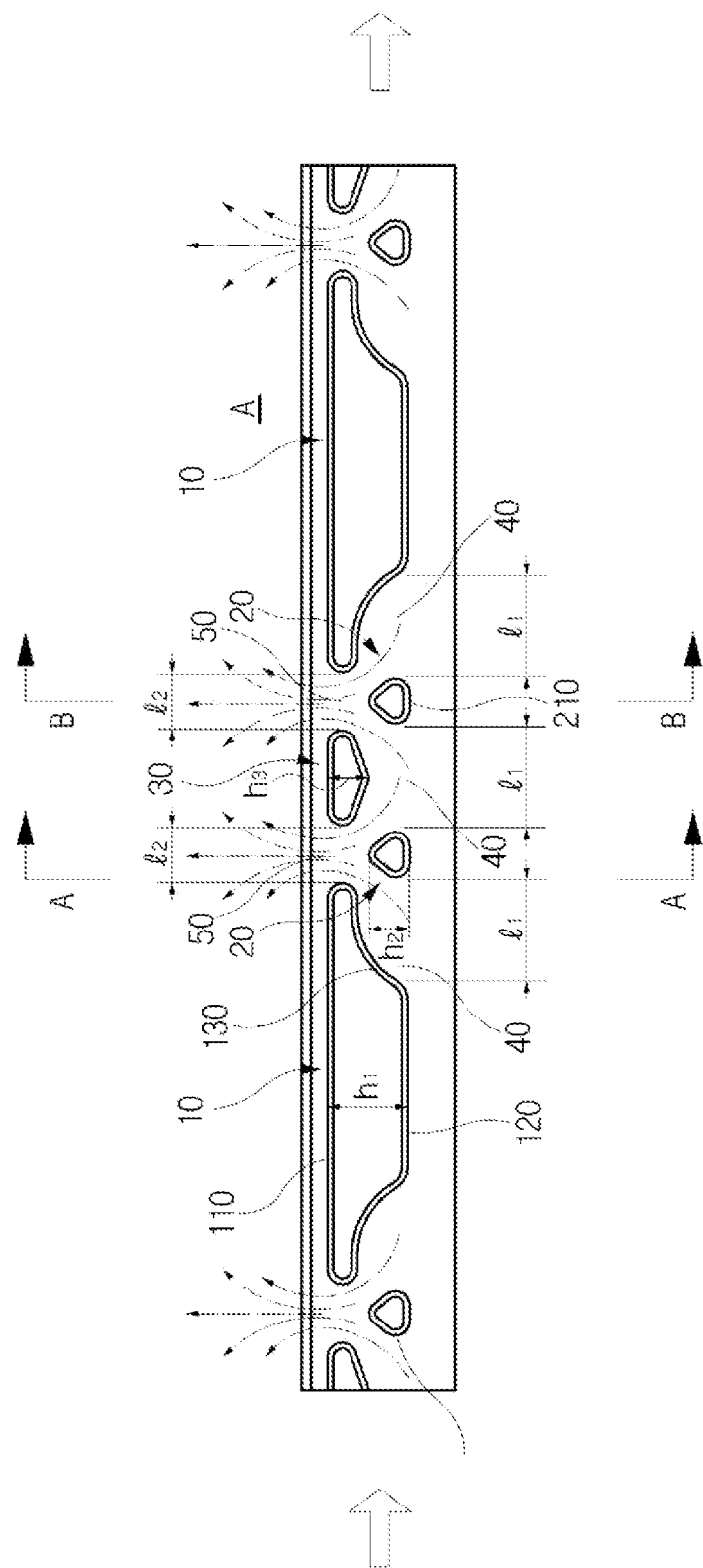
FIG. 2 is a front view showing a water-drip hose according to the present invention.

| | |
|---|---|
| 1: Resin film | 2: Outer film |
| 3: Inner film | 4: Overlapped portion |
| 5: Main water flow path | |
| 10: First fusion splicing unit | |
| 20: Second fusion splicing unit | |
| 30: Third fusion splicing unit | |
| 40: Lower opening | 50: Upper opening |
| 110: Upper fusion splicing line | |
| 120: Lower fusion splicing line | |
| 130: Side fusion splicing line | |

DETAILED DESCRIPTION OF THE PREFERRED EMBODIMENT

The preferred embodiments of the invention will be hereafter described with reference to the accompanying drawings.

As shown in FIGS. 1 to 4, the water-drip hose A according to the present invention may be configured to include an overlapped portion 4 formed by overlapping an outer film 2 with an inner film 3 of a resin film 1 having tiny projections on one side. The outer film 2 is one end portion of the resin film 1, and the inner film 3 is the other end portion of the resin film 1. A main water flow path 5 is formed inside the hose by a plurality of first fusion splicing units 10 fusedly formed on the overlapped portion 4, and water flowing into the hose through the main water flow path 5 is discharged to upper openings 50 through the gap formed between the inner and outer films 3 and 2 of the overlapped portion 4 bonded by the first fusion splicing unit 10.

The plurality of tiny projections 11 formed on one side of the resin film 1 prevents the main water flow path 5 provided inside the resin film 1 from being tightly stuck together and prevents a flow path of the overlapped portion 4, i.e., a gap between the inner and outer films 3 and 2, from being narrowed, and the projection 11 preferably has a size of 20 to 80 meshes. Although the size of the tiny projection 11 is determined as 20 to 80 meshes in the present invention, it is further preferable that the tiny projection 11 has a size of 30 to 70 meshes.

Here, the first fusion splicing unit 10 is formed in a shape of a closed loop, in which an upper fusion splicing line 110 is formed in parallel to an end portion of the outer film 2, and a lower fusion splicing line 120 shorter than the upper fusion splicing line 110 is formed to be spaced apart from the upper fusion splicing line 110 below the upper fusion splicing line 110. A side fusion splicing line 130 for connecting the upper fusion splicing line 110 with the lower fusion splicing line 120 is formed at both sides of the upper fusion splicing line 110 and the lower fusion splicing line 120 in a shape of a smooth curve.

At a lower position between the first fusion splicing unit 10 and a neighboring first fusion splicing unit 10, two second fusion splicing units 20 parallel to the lower fusion splicing line 120 of the first fusion splicing unit 10 are formed at regular intervals, and thus three lower openings 40 are formed.

The width $l_2$ of the lower opening 40 is formed to be larger than the width $l_2$ of the upper opening 50.

The second fusion splicing units 20 are formed in the shape of , so that a lower fusion splicing line 210 of the second fusion splicing unit 20 is formed in parallel to the lower fusion splicing line 120 of the first fusion splicing unit 10.

The height $h_2$ of the second fusion splicing unit 20 is configured to be half of the height $h_1$ of the first fusion splicing unit 10.

At an upper position between the first fusion splicing unit 10 and a neighboring first fusion splicing unit 10, a third fusion splicing unit 30 parallel to the upper fusion splicing line 110 of the first fusion splicing unit 10 is formed, and thus two upper openings 50 are formed.

The third fusion splicing unit 30 is formed in the shape of , so that an upper fusion splicing line 310 of the third fusion splicing unit 30 is formed in parallel to the upper fusion splicing line 110 of the first fusion splicing unit 10.

The height $h_3$ of the third fusion splicing unit 30 is configured to be the same as the height $h_2$ of the second fusion splicing unit 20.

Meanwhile, the first fusion splicing unit, the second fusion splicing unit 20 and the third fusion splicing unit 30 are formed by heat fusion or high frequency fusion.

Figure 3:
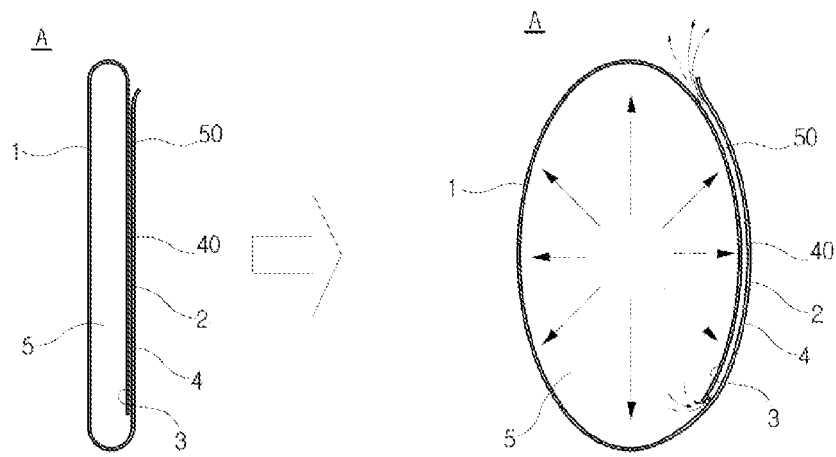
FIG. 3 is a cross sectional view taken along the line A-A in FIG. 2.
Figure 4:
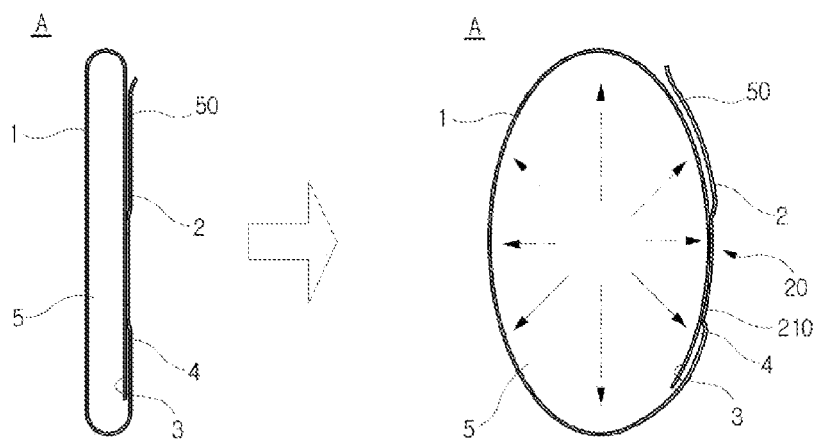
FIG. 4 is a cross sectional view taken along the line B-B in FIG. 2.

In the water-drip hose A configured as described above, first, the resin film 1 is expanded as shown in FIG. 3 by the water pressure when the water supplied through the main water flow path 5 moves along the longitudinal direction of the water-drip hose A.

Next, while the resin film 1 is expanded, some of the water in the main water flow path 5 flows in through the lower portion of the overlapped portion 4 where the inner film 3 is overlapped with the outer film 3 to face each other, and then the water is guided by the lower fusion splicing line 120 and the side fusion splicing line 130 of the first fusion splicing unit 10 and moves to the upper portion. At this point, the water is pressured and accelerated furthermore as the flow path is narrowed on the whole, when the water moves toward the upper portion through the spaces formed between the second fusion splicing units 20 which are fusedly formed at the lower position between the first fusion splicing unit 10 and the neighboring first fusion splicing unit 10.

Next, the accelerated water is discharged outside through the upper openings 50 formed above the second fusion splicing units 20, i.e., through the upper openings 50 respectively formed between the first fusion splicing unit 10 or the neighboring first fusion splicing unit 10 and the third fusion splicing unit 30 fusedly formed to be aligned with the upper fusion splicing line 110, and thus the water can be sufficiently supplied to the roots of crops.

Meanwhile, although the main water flow path 5 formed inside the resin film 1 is dried and tightly stuck together if supply of water is stopped, the main water flow path 5 is prevented from being completely stuck together owing to the plurality of tiny projections 11 of 30 to 70 meshes formed on the inner surface of the resin film 1, and thus water can be smoothly supplied thereafter.

In addition, as shown in FIG. 3, since the resin film 1 is expanded, the flow path of the overlapped portion 4, i.e., the space between the inner and outer films 3 and 2, is narrowed, and thus flow of the water may be hindered. However, since there is a plurality of tiny projections 11 formed on the inner surface of the resin film 1, the water may flow through the tiny projections 11.

In the present invention, the water supplied to the water-drip hose through the main water flow path is uniformly discharged through the upper openings formed between the first fusion splicing units regardless of water pressure, and thus uniform growth of crops may be maintained.

Furthermore, although foreign materials flow into the water-drip hose, only a specific portion of the hose is clogged. Therefore, the water is continuously discharged through the other upper openings, and thus the crops can be prevented from being withered to die.

Furthermore, although inside of the water-drip hose is dried, it is possible to prevent the inside of the water-drip hose from being stuck together and the upper openings from being clogged, and thus it is convenient to use the water-drip hose.

Furthermore, owing to the plurality of tiny projections formed on the inner surface of the hose, the lower openings are easily opened, and since the inner film is expanded by the water pressure inside the hose, flow of water through the lower and upper openings is not hindered.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A water-drip hose, in which an overlapped portion is formed by overlapping an outer film at one end portion of a resin film with an inner film at the other end portion of the resin film, and a main water flow path is formed inside the water-drip hose by a plurality of fusion splicing units fusedly formed on the overlapped portion, the water-drip hose comprising:

a plurality of first fusion splicing units, each first fusion splicing unit formed to have an upper fusion splicing line parallel to an end of the outer film, a lower fusion splicing line shorter than the upper fusion splicing line, and side fusion splicing lines of a smooth curved shape for connecting the upper fusion splicing line with the lower fusion splicing line;

two second fusion splicing units respectively formed at a lower position between two neighboring first fusion splicing units of the plurality of first fusion splicing units in parallel to the lower fusion splicing line of each of the two neighboring first fusion splicing units at regular intervals, which forms three lower openings; and a third fusion splicing unit formed at an upper position between said two neighboring first fusion splicing units in parallel to the upper fusion splicing line of each of the two neighboring first fusion splicing units, which forms two upper openings.

2. The water-drip hose according to claim 1, wherein the second fusion splicing units are formed in a shape of an isosceles triangle having rounded edges, so that a lower fusion splicing line of the second fusion splicing units is formed in parallel to the lower fusion splicing line of each of the two neighboring first fusion splicing units, and the third fusion splicing unit is formed in a shape of an inverted isosceles triangle having rounded edges, so that an upper fusion splicing line of the third fusion splicing unit is formed in parallel to the upper fusion splicing line of each of the two neighboring first fusion splicing units.

3. The water-drip hose according to claim 2, wherein width $l1$ of the lower opening is formed to be greater than width $l2$ of the upper opening.

4. The water-drip hose according to claim 2, wherein a height $h2$ of each of the second fusion splicing units is a half of height $h1$ of each of the two neighboring first fusion splicing units, and a height $h3$ of the third fusion splicing unit is the same as the height $h2$ of each of the second fusion splicing units.

5. The water-drip hose according to claim 2, wherein the plurality of first fusion splicing units, the second fusion splicing units and the third fusion splicing unit are formed by heat fusion or high frequency fusion, and a plurality of tiny projections having a size of 30 to 70 meshes is formed on one side of the resin film.

6. The water-drip hose according to claim 1, wherein width $l1$ of the lower opening is formed to be greater than width $l2$ of the upper opening.

7. The water-drip hose according to claim 1, wherein a height $h2$ of each of the second fusion splicing units is a half of height $h1$ of each of the two neighboring first fusion splicing units, and a height $h3$ of the third fusion splicing unit is the same as the height $h2$ of each of the second fusion splicing units.

8. The water-drip hose according to claim 1, wherein the plurality of first fusion splicing units, the second fusion splicing units and the third fusion splicing unit are formed by heat fusion or high frequency fusion, and a plurality of tiny projections having a size of 30 to 70 meshes is formed on one side of the resin film.

\* \* \* \* \*